(12) United States Patent
Bowen (10) Patent No.: US 8,031,993 B2
(45) Date of Patent: Oct. 4, 2011

(54) OPTICAL FIBER INTERCONNECT DEVICE

(75) Inventor: Terry P. Bowen, Dillsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 7 days.

(21) Appl. No.: 12/510,954

(22) Filed: Jul. 28, 2009

(65) Prior Publication Data

US 2011/0026875 A1 Feb. 3, 2011

(51) Int. Cl.
*G02B 6/26* (2006.01)
*G02B 6/42* (2006.01)
*H04B 10/12* (2006.01)

(52) U.S. Cl. ............ 385/38; 385/43; 398/141; 398/200; 398/214

(58) Field of Classification Search ...................... 385/38
See application file for complete search history.

(56) References Cited

U.S. PATENT DOCUMENTS

| | | |
|---|---|---|
| 4,092,061 A | 5/1978 | Stigliani, Jr. |
| 4,130,343 A | 12/1978 | Miller et al. |
| 5,627,931 A | 5/1997 | Ackley et al. |
| 6,445,854 B1 * | 9/2002 | Miller .............................. 385/38 |
| 6,792,178 B1 | 9/2004 | Zhou |
| 6,869,229 B2 * | 3/2005 | Reedy et al. ..................... 385/88 |
| 7,511,258 B2 | 3/2009 | Bowen et al. |
| 2005/0036728 A1 | 2/2005 | Braunisch |
| 2009/0087145 A1 | 4/2009 | Rolston et al. |

FOREIGN PATENT DOCUMENTS

| | | |
|---|---|---|
| DE | 20 2008 009454 | 9/2008 |
| EP | 0 535 690 | 4/1993 |
| EP | 1 336 883 | 8/2003 |
| EP | 2 128 672 | 12/2009 |
| WO | WO 2008/114717 | 9/2008 |

OTHER PUBLICATIONS

International Search Report, International Application No. PCT/US2010/002027, International Filing Date Jul. 19, 2010.

* cited by examiner

*Primary Examiner* — Jerry Rahll

(57) ABSTRACT

A fiber optic interconnect device includes a silicon substrate having at least one groove formed therein. The groove includes a pair of sidewalls and a first end disposed at an end of the pair of sidewalls. The device also includes an optical fiber disposed in the groove, the optical fiber having a cylindrical body, an endface formed on an end of the cylindrical body, and a multi-faceted mirror formed on the endface, and a light source adapted to transmit light to the multifaceted mirror to launch light through the optical fiber to a detector.

19 Claims, 7 Drawing Sheets

FIG. 9

OPTICAL FIBER INTERCONNECT DEVICE

BACKGROUND OF THE INVENTION

The subject matter herein relates generally to fiber optic devices and more particularly, to an interconnect device having a shaped optical fiber endface mirror that enables a compact right angle source launch assembly.

Fiber optics are used in a wide variety of applications. The use of optical fibers as a medium for transmission of digital data (including voice data) is becoming increasingly more common due to the high reliability and large bandwidth available with optical transmission systems. Fundamental to these systems are optical assemblies for transmitting and/or receiving optical signals.

One conventional device for transmitting optical signals includes a silicon substrate having a groove formed therein for securing the optical fiber. The substrate serves as the main foundation for the optical assembly and also serves to secure the optical fiber in a fixed position. The conventional groove is preferably formed in the shape of a "V" by etching the substrate to include two sidewalls that retain the optical fiber along its length and an end face that is used as a mirror device. The conventional V-groove has a particular pitch α, which is the angle between the walls of the V-groove and a top or reference surface in which the V-groove was etched. Each of the sidewalls and the end face are typically formed at a precise angle of 54.7 degrees from the reference surface due to the crystalline structure of silicon.

During operation, the end face of the conventional device V-channel is metalized so that it may be used as mirror to launch light into an optical fiber. Specifically, a light source emits a cone-shaped light beam onto the V-channel end face mirror. The V-channel end face mirror reflects the light through an end of the optical fiber. As discussed above, the surface of the V-channel end face is at an angle of precisely 54.7 degrees from the reference surface. As such, light is reflected off the channel end face mirror through the optical fiber at approximately −9.3 degrees from the reference surface. However, current devices utilizing the end face mirror of the channel to launch light through an end of the optical fiber causes much of the light to be reflected away from the axis of the optical fiber resulting in non-optimal signal transmission performance.

BRIEF DESCRIPTION OF THE INVENTION

In one embodiment, a fiber optic interconnect device is provided. The fiber optic interconnect device includes a silicon substrate having at least one groove formed therein. The groove includes a pair of sidewalls and a first end disposed at an end of the pair of sidewalls. The device also includes an optical fiber disposed in the groove, the optical fiber having a cylindrical body, an endface formed on an end of the cylindrical body, and a multi-faceted mirror formed on the endface, and a light source adapted to transmit light to the multifaceted mirror to launch light through the optical fiber to a detector.

In another embodiment, another fiber optic source interconnect device is provided. The interconnect device includes a silicon substrate having at least one groove formed therein, the groove including a pair of sidewalls and a first end disposed at an end of the pair of sidewalls, a first array of metal solder pads positioned on the silicon substrate relative to the groove, an optical fiber disposed in the groove, the optical fiber having a cylindrical body, with a central optical axis, an endface formed on an end of the cylindrical body, and a multi-faceted mirror formed on the endface, the multi-faceted mirror including a positioning facet configured to contact the first end of the silicon substrate groove, and a light source disposed on the silicon substrate, the light source including a second array of metal solder pads that correspond to the first array of metal solder pads, the second array of solder pads being positioned relative to the source aperture, the light source configured to transmit light to the multi-faceted mirror to launch light through the optical fiber to a detector.

In a further embodiment, another fiber optic detector interconnect device is provided. The interconnect device includes a silicon substrate having at least one groove formed therein, the groove including a pair of sidewalls and a first end disposed at an end of the pair of sidewalls, a first array of metal solder pads positioned on the silicon substrate relative to the groove, an optical fiber disposed in the groove, the optical fiber having a cylindrical body, an endface formed on an end of the cylindrical body, and a multi-faceted mirror formed on the endface, the multi-faceted mirror including a positioning facet configured to contact the first end of the silicon substrate groove, and a light detector disposed on the silicon substrate, the light detector having a second array of metal solder pads that correspond with the first array of metal solder pads, the second array of metal solder pads being positioned relative to the detector aperture and adapted to receive light from the multi-faceted mirror formed on the endface of the optical fiber and receive light transmitted through the optical fiber from a light source.

DETAILED DESCRIPTION OF THE INVENTION

Figure 1:
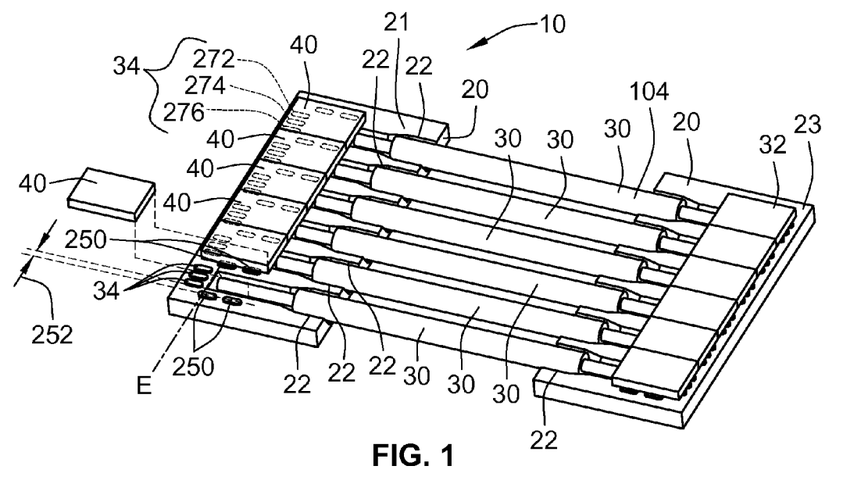
FIG. 1 is a top perspective view of an exemplary interconnect device in accordance with an embodiment of the present invention.
Figure 2:
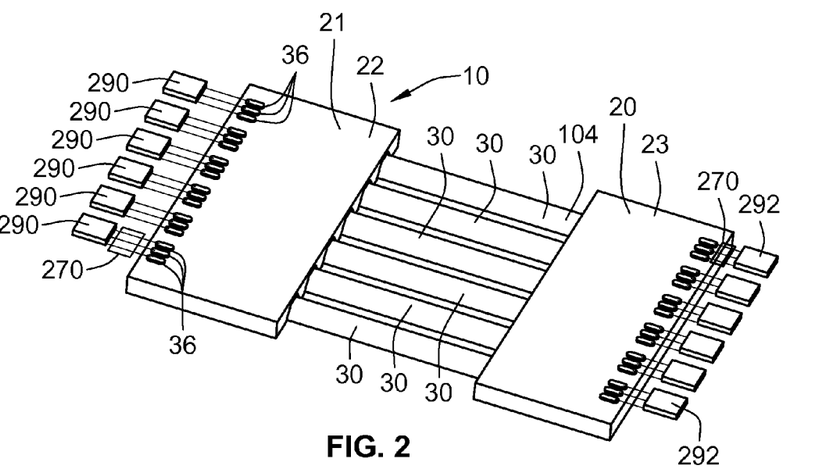
FIG. 2 is a bottom perspective view of the exemplary interconnect device shown in FIG. 1 in accordance with an embodiment of the present invention.

FIG. 1 is a top perspective view of an exemplary interconnect device 10 in accordance with an embodiment of the present invention. FIG. 2 is a bottom perspective view of the exemplary interconnect device 10 shown in FIG. 1 in accordance with an embodiment of the present invention. The interconnect device includes a substrate 20, having two portions 21 and 23, each portion 21 and 23 having at least one groove 22 formed therein. The interconnect device 10 also includes an optical fiber 30 that is disposed in each respective groove 22. In one embodiment, the optical fiber 30 is a multimode optical fiber with a multi-faceted endface mirror 110 (shown in FIG. 5). The optical fiber 30 has an outer diameter of approximately 80 microns. Optionally, the optical fiber 30 is a single mode fiber. It should be realized that the interconnect device 10 described herein may be configured to operate with any type of optical fiber.

The interconnect device 10 also includes a light source 40 that is configured to transmit a beam of light through the optical fiber 30 to a respective detector 32. In the exemplary embodiment, the light source 40 is a vertical-cavity surface-emitting laser (VCSEL). Optionally, the light source 40 may be embodied as a light emitting diode (LED) or another semiconductor light emitting device, for example. A VCSEL is a semiconductor laser diode that is configured to emit a beam of light perpendicular from the top surface of the VCSEL. In operation, the VCSEL emits a beam of light through the side of the optical fiber 30 (e.g. through the cladding of the optical fiber). The light is then reflected from the multi-faceted endface mirror 110 and transmitted through the optical fiber 30 to the detector 32.

Referring again to FIG. 1, in one embodiment, the detector 32 may be configured to receive the optical signal from the optical fiber 30, e.g. the detector 32 is configured on a substrate 20 and electrically connected to a receiver circuit 292 shown in FIG. 2 through contacts 34, contacts 36 and substrate vias 38 (both shown in FIG. 5), and a flex circuit 270. The connection of the light source 40 and detector 32 using the contacts 34 and 36 will be discussed in further detail below.

In the exemplary embodiment, the interconnect device 10 includes N grooves 22 that are formed in the substrate 20. The interconnect device 10 also includes N optical fibers 30, wherein a single optical fiber 30 is disposed in a single respective groove 22. Moreover, the interconnect device 10 includes N light sources 40, wherein each light source 40 transmits light through a respective optical fiber 30 installed in a respective groove 22. In one embodiment, N is greater than 1. Optionally N may be equal to 1. In the exemplary embodiment illustrated herein, N is equal to six.

Figure 3:
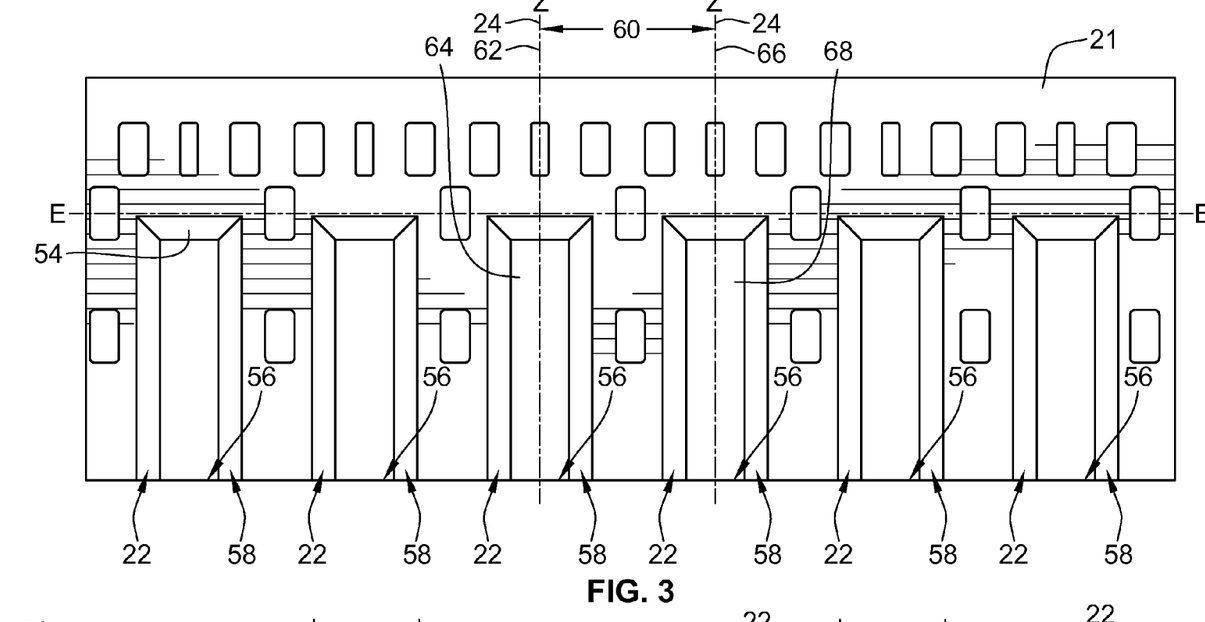
FIG. 3 is a top perspective view of the substrate shown in FIGS. 1 and 2 in accordance with an embodiment of the present invention.
Figure 4:
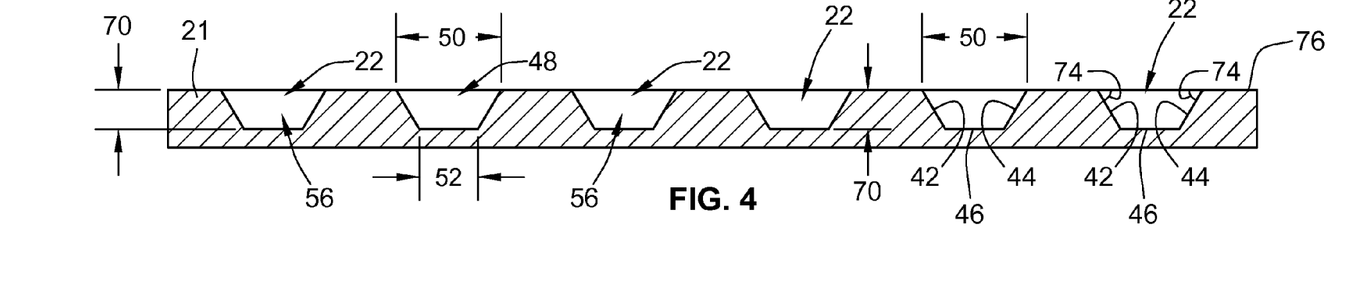
FIG. 4 is an end section view of the substrate shown in FIG. 3 in accordance with an embodiment of the present invention.

FIG. 3 is a top perspective view of the substrate portion 21 shown in FIGS. 1 and 2 in accordance with an embodiment of the present invention. FIG. 4 is an end section view of the substrate portion 21 shown in FIG. 3 in accordance with an embodiment of the present invention. It should be realized that the substrate portion 21 is substantially the same as the substrate portion 23, as such only the substrate portion 21 is described below. In the exemplary embodiment, the substrate 20 is a silicon wafer that is etched to form a plurality of V-shaped grooves 22. The substrate 20, including the V-shaped grooves 22, functions as an optical mounting platform that substantially eliminates or reduces the need for actively aligning the various components that are coupled to the substrate 20. More specifically, for components to be optically aligned, they must be held in a precise spatial relationship with respect to each other along the x, y, and z axes. (The z-axis is, by convention, the optical axis.)

There are generally two alignment approaches for aligning optical components on a platform, active alignment and passive alignment. In active alignment, the optical components are placed on the platform, but before being affixed thereto, an optical signal is transmitted through the components while they are manipulated to provide optimum optical performance. Once optimum performance is achieved, the components are affixed to the platform. In passive alignment, registration or alignment features are typically fabricated directly on the components as well as on the platform to which the components are to be mounted. The components are then positioned on the platform using the alignment features and affixed in place. In the exemplary embodiment, the interconnect device 10 includes various alignment features that enable optical components to be passively aligned on the substrate 20. One such alignment feature is the grooves 22 which permit the optical fibers 30 to be aligned along a Z-axis or optical axis 24 shown in FIG. 3. Other alignment features are discussed in further detail below. In the exemplary embodiment, each V-groove 22 is aligned along the Z-axis 24 such that the plurality of V-grooves 22 are arranged in a parallel configuration.

In the exemplary embodiment, the substrate 20 is the foundation for the optical components to be attached thereto. Moreover, the substrate 20 serves as the backbone to support and align the optical components attached thereto. The substrate 20 is fabricated from a rigid material which can be etched or machined to form the V-grooves 22. For example, the substrate may be fabricated from elemental materials having a crystalline form, a polymeric material, a glass material, a ceramic material, e.g. oxides, nitrides, carbides, borides and silicides of metals or semi-metals and combinations thereof. Other suitable materials include a quartz material and a metallic material. In the exemplary embodiment, the substrate 20 is fabricated using a silicon material, e.g. a silicon wafer.

Referring again to FIG. 4, each V-groove 22 includes a first side wall 42, a second side wall, 44 and a bottom surface 46. The combination of the first and second side walls 42 and 44 and the bottom surface 46 form a substantially V-shaped groove having the flat bottom surface 46. The V-shaped groove 22 has an opening 48 that is formed opposite to the bottom surface 46. The opening 48 has a groove width 50 at the surface 76 of the substrate 20 that is greater than a width 52 of the bottom surface 46 to enable the optical fiber 30 to be at least partially disposed within the groove 22. The groove width 50 of the opening 48 is between approximately 125 and 175 microns. In the exemplary embodiment, the groove width 50 is approximately 150 microns to enable an optical fiber having a diameter of approximately 80 microns to be positioned in the groove 22.

Referring again to FIG. 3, each groove 22 also includes a first end 54 and an opening 56 that is formed at a distal end 58 of the groove 22. Specifically, the combination of the sidewalls 42 and 44, the bottom surface 46, the first end 54, and the opening 58 define a V-shaped groove that is open at the upper surface and open at the distal end to enable an optical fiber to be inserted therein. In the exemplary embodiment, as shown in FIG. 3, each groove 22 is separated from an adjacent groove 22 by a predefined distance 60. The predefined distance 60 is measured from a centerline 62 of a first groove 64 to a centerline 66 of an adjacent groove 68. The predefined distance 60 is based on the width 50 of the groove 22. For example, in the exemplary embodiment, the diameter of the optical fiber 30 is approximately 80 microns and the predefined distance 60 is approximately 250 microns. Moreover, if an optical fiber 30 is used that has a diameter that is greater than 80 microns, the predefined distance 60 may be greater than 250 microns. Additionally, if the optical fiber 30 has a diameter that is less than 80 microns, the predefined distance 60 may be less than 250 microns.

As shown in FIG. 4, each V-shaped groove 22 is also formed to have a predefined depth 70. The predefined depth 70 is based on the diameter of the optical fiber to be installed in the groove 22. For example, in the exemplary embodiment, the optical fiber 30 has a diameter of approximately 80 microns, e.g. the diameter of the optical core and the cladding material surround the optical core is approximately 80 microns. In this case, the predetermined depth 70 is greater than 80 microns. In the exemplary embodiment, the depth 70 of the groove 22 is greater than the diameter of the optical fiber to be installed in the groove so that the fiber will not contact the groove bottom surface 46. The width 50 of the groove is selected such that a portion of the optical fiber extends above a surface 76 of the substrate 20 in which the grooves 22 are formed and the fiber will only contact groove sidewalls 42 and 44 for passive alignment. It should be realized that the width 50 and the depth 70 of the grooves 22 are determined based on the diameter of the optical fiber to be installed in the groove 22.

The V-grooves 22 are formed in the substrate 20 using an etching procedure. In the exemplary embodiment, the V-grooves 22 are defined in the substrate 20 using a wet etching procedure. Wet etching is preferred from a cost effectiveness and accuracy standpoint since extremely precise wet etching techniques can be performed on a large-scale basis more readily than dry etching. Accordingly, in a preferred embodiment, the substrate 20 has a crystalline form so that wet etching techniques may be used to form V-shaped grooves 22 having predictable shape and/or geometry.

As shown in FIG. 4, the groove sides 42/44 and first end 54 are each etched to a predetermined angle 74. In one embodiment, the predetermined angle 74 is between 53 and 56 degrees. In the exemplary embodiment, the predetermined angle 74 is approximately 54.7 degrees. The predetermined angle 74 refers to the angle between the V-groove sides 42/44 and the surface 76 of the substrate 20 in which the V-groove was etched. The predetermined angle 74 depends upon the etching technique used and the material being etched. For example, due to the crystalline structure of silicon, a predictable and highly precise angle of 54.7 degrees can be realized in a V-groove wet etched in silicon.

Figure 5:
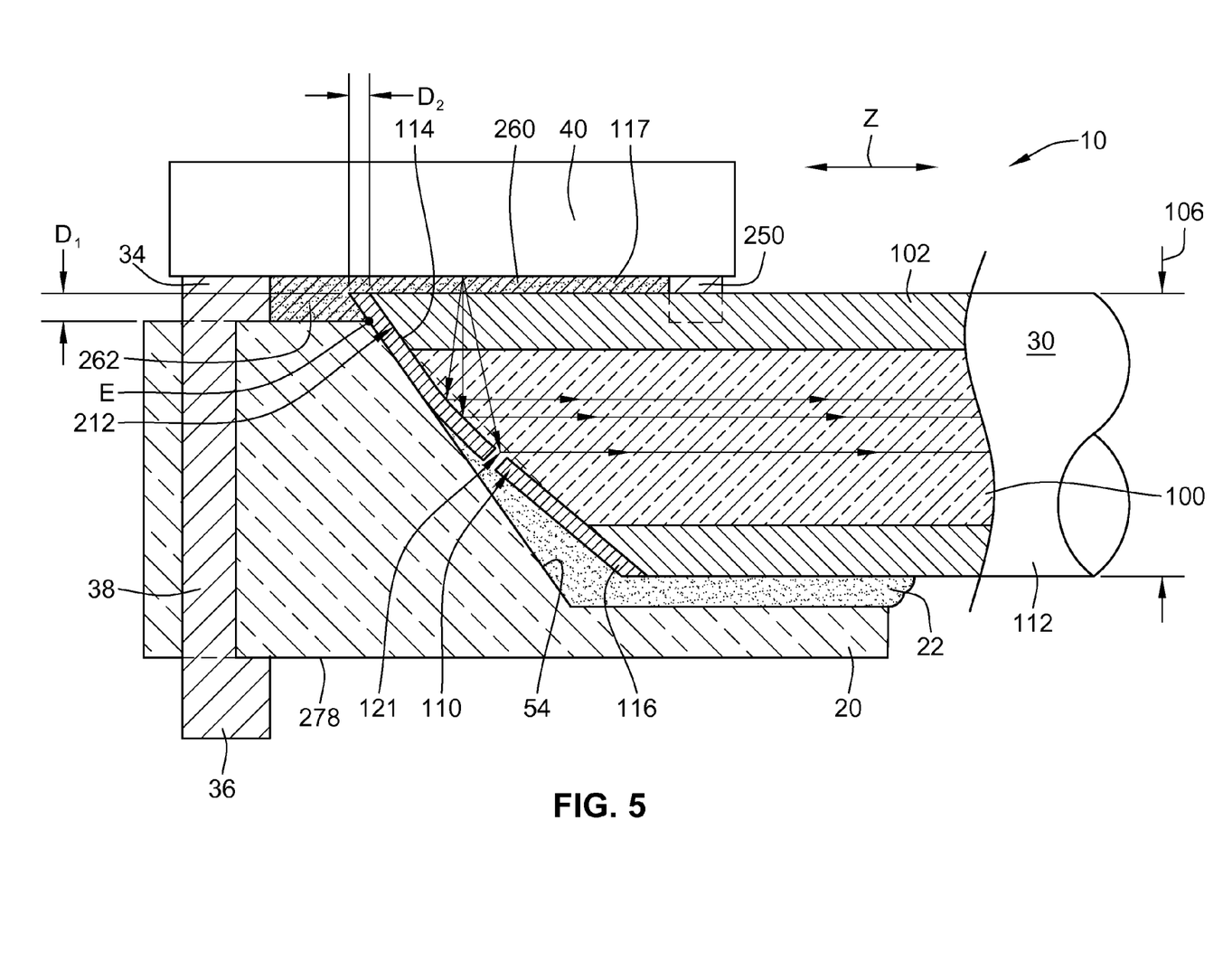
FIG. 5 is a side section view of an exemplary optical fiber installed in the interconnect device shown in FIG. 1 in an embodiment of the present invention.

FIG. 5 is a side section view of an exemplary optical fiber 30 installed in a respective groove 22. The optical fiber 30 includes a core 100 and a cladding 102 surrounding the core 100. The optical fiber may also include a protective covering material 104 that surrounds the cladding 102. An example of the protective covering material 104 is shown in FIGS. 1 and 2. As discussed above, in the exemplary embodiment, the optical fiber 30 has an outer diameter 106 that is approximately 80 microns. The outer diameter 106 includes both the core 100 and the cladding 102.

The first end 54 of the groove 22 is etched to a predetermined angle 74 that in the exemplary embodiment is approximately 54.7 degrees. As discussed above, at least one known conventional device utilizes the end of the channel, (e.g. the first end 54) to launch light through the optical fiber. However, the conventional device causes much of the light to be reflected away from the optical fiber resulting in non-optimal signal transmission performance. As such, in the exemplary embodiment described herein, the optical fiber 30 is formed to include a multi-faceted mirror 110.

More specifically, the optical fiber 30 includes a cylindrical body 112 having an endface 114 formed on an end of the cylindrical body 112. The endface 114 of the optical fiber 30 is then modified to form the multi-faceted mirror 110. Specifically, during fabrication, in one embodiment, the endface 114 is cleaved to form the multi-faceted mirror 110. The endface cleaving may be accomplished utilizing a laser cleaving device (not shown). Optionally, the endface 114 may be cleaved using any other device suitable for removing a portion of the optical fiber endface 114. For example, the endface 114 may be formed into a multi-faceted mirror 110 using an etching technique, by grinding and polishing the endface 114, and/or using a photolithographic technique for the addition and/or removal of material to the fiber endface 114.

In the exemplary embodiment, laser cleaving the endface 114 enables a specific surface contour, i.e. the multi-faceted mirror 110, to be machined onto the multimode fiber endface 114. Moreover, applying a coating 116 to the endface 114, enables the optical fiber 30, including the integrated multi-faceted mirror 110 to be permanently and stably aligned with the central optical axis of the optical fiber 30. By positioning the integrated mirror 110 and the optical fiber 30 relative to a source (VCSEL or LED), a specific mode power distribution can then be launched into the multimode fiber waveguide. This will allow source specifications for specific mode power distribution launch conditions to be met with a simple, low cost and stable (over environments & time) packaging approach. More specifically, by combining the multi-faceted mirror 110 and a wet etched V-groove 22, the integrated optical fiber 30, including the multifaceted mirror 110 can be passively aligned to the substrate 20, via the V-groove 22, to a high precision by simple mechanical assembly.

Figure 6:
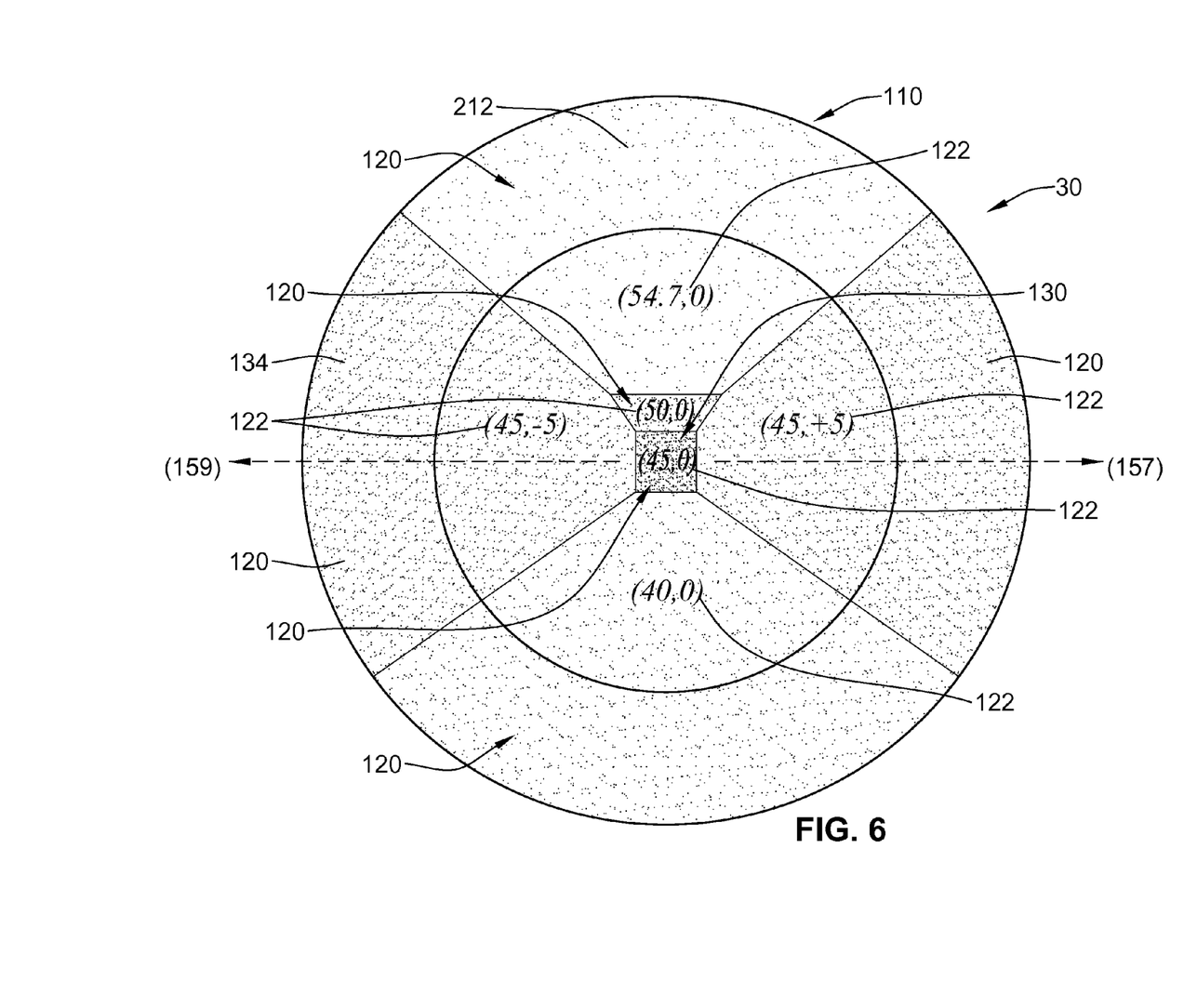
FIG. 6 is a schematic illustration of an exemplary multifaceted mirror that may be formed onto an optical fiber in an embodiment of the present invention.
Figure 7:
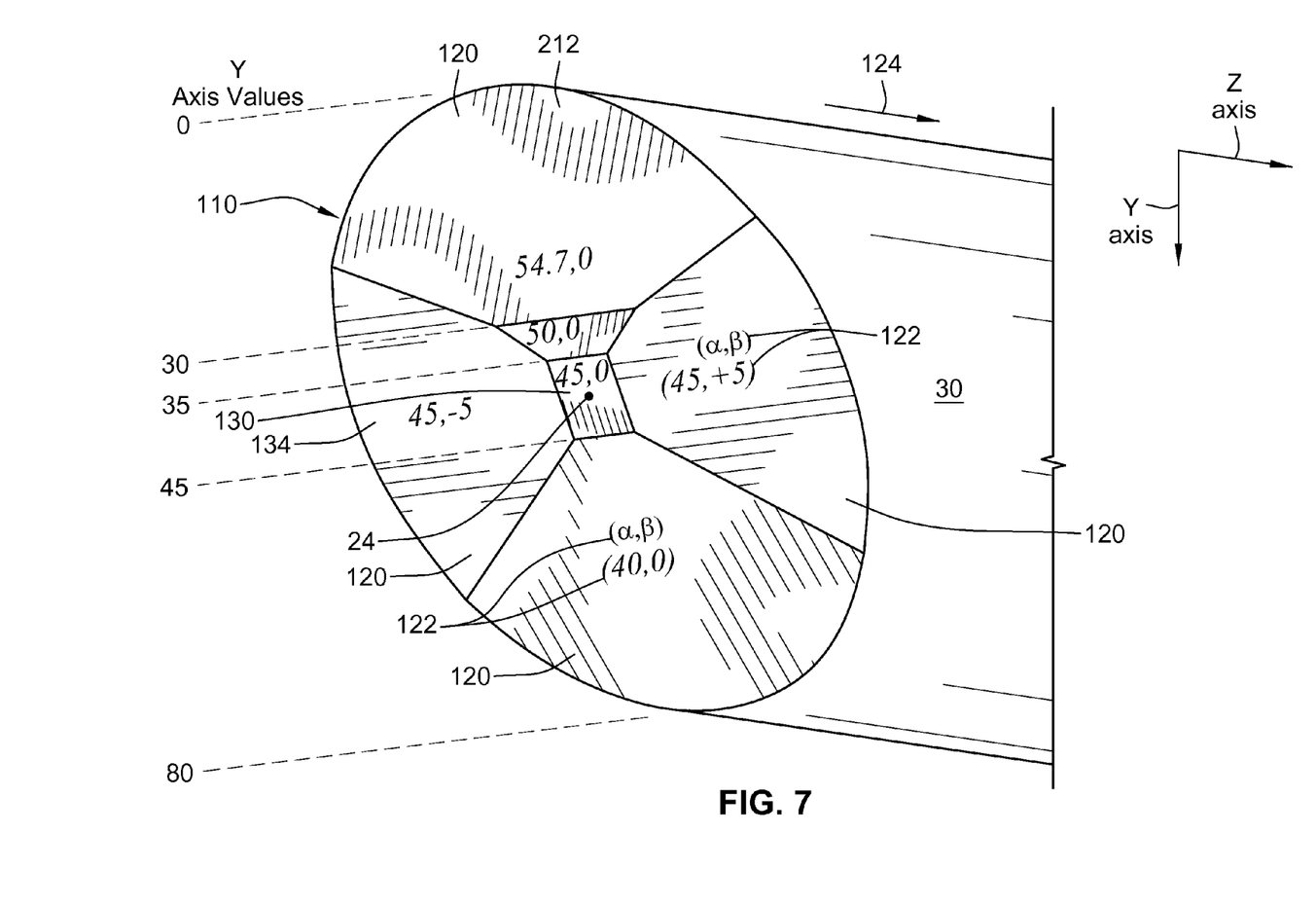
FIG. 7 is a front view of the multi-faceted mirror shown in FIG. 6.

FIG. 6 is a schematic illustration of an exemplary multi-faceted mirror 110 that may be etched onto an optical fiber, such as optical fiber 30. FIG. 7 is a front view of the multi-faceted mirror 110 shown in FIG. 6. In the exemplary embodiment, the multi-faceted mirror 110 includes a plurality of planar segments 120, also referred to herein as mirror segments. The planar segments 120 are each positioned or formed to provide the optimal light reflection down the longitudinal axis of the optical fiber 30. Specifically, the planar segments 120 are each etched such that a light beam emitting from the light source 40 (shown in FIG. 1) strikes each planar segment 120 at an optimal angle to enable the light beam to be transmitted through the optical fiber 30.

As shown in FIGS. 6 and 7, each of the planar segments 120 is located or etched based on a pair of angle identifiers 122. The pair of angle identifiers ($\alpha$, $\beta$) define the complex angle of each planar segment 120 with respect to a Z-axis and a 45 degree rotation of the Z-axis. The Z-axis is substantially parallel to a centerline axis extending through the optical fiber 30, e.g. centerline 62 or 66 shown in FIG. 3.

For example, as shown in FIG. 6, one exemplary planar segment 130 is etched using a pair of angle identifiers (45, 0). In this case, the planar segment 130 is formed at an angle of 45 degrees with respect to the Z-axis and at an angle of 0 degrees with respect to a 45 degree rotation of the Z-axis forming an axis that is normal to the face of the planar segment 130. Moreover, another exemplary planar segment 134 is etched at a pair of angle identifiers (45, −5). Specifically, the planar segment 134 is etched at an angle of 45 degrees with respect to the Z-axis and at an angle of −5 degrees with respect to the face of the planar segment 130. As shown in FIGS. 6 and 7, each planar segment 120 is formed or etched based on a respective pair of angle identifiers ($\alpha$, $\beta$). In the exemplary embodiment, the angle identifiers ($\alpha$, $\beta$) are selected to optimize the transmission of light through the optical fiber 30.

Figure 8:
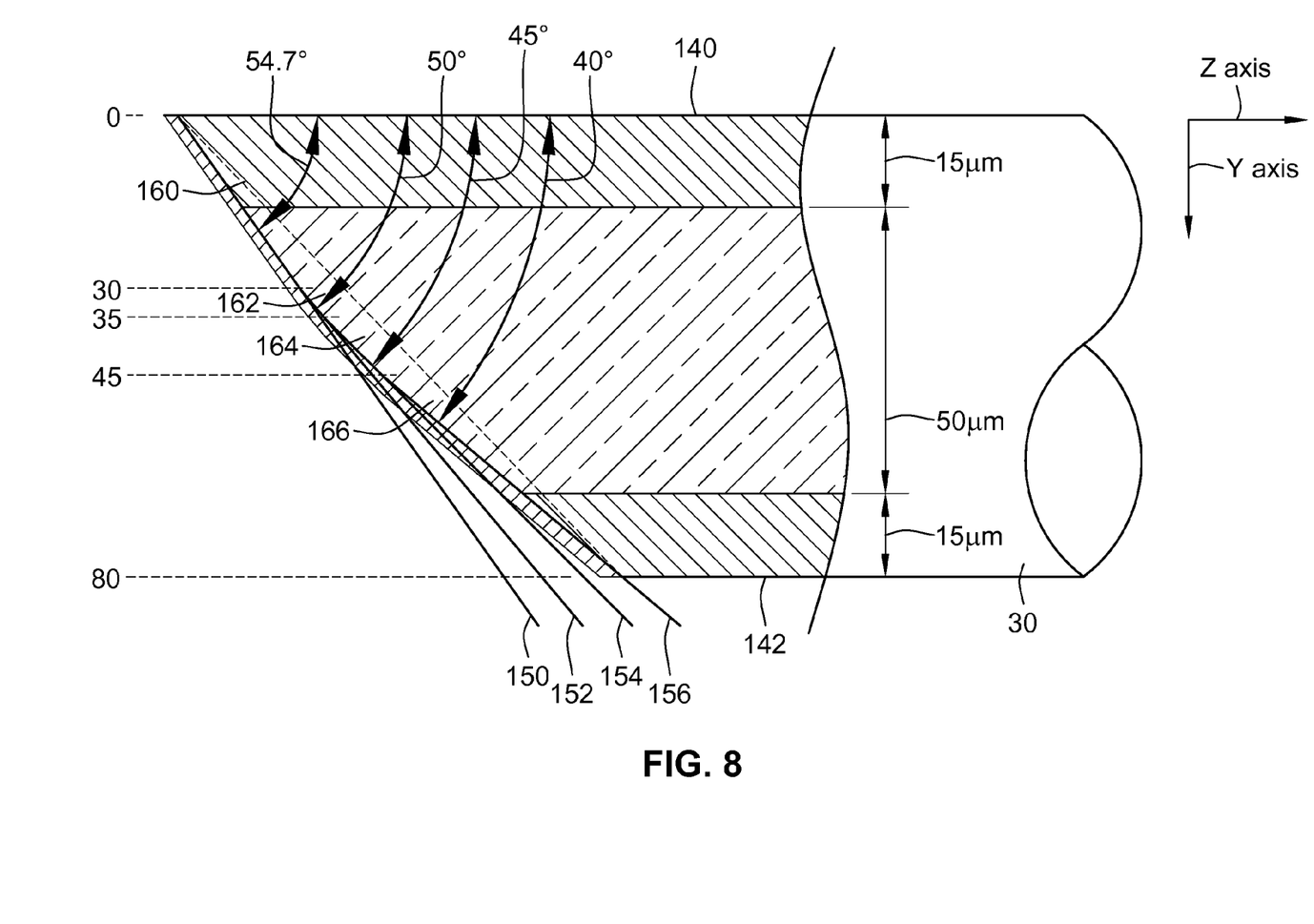
FIG. 8 is a side view of a plurality of cuts or cleaves made to form the mirror shown in FIG. 6.
Figure 9:
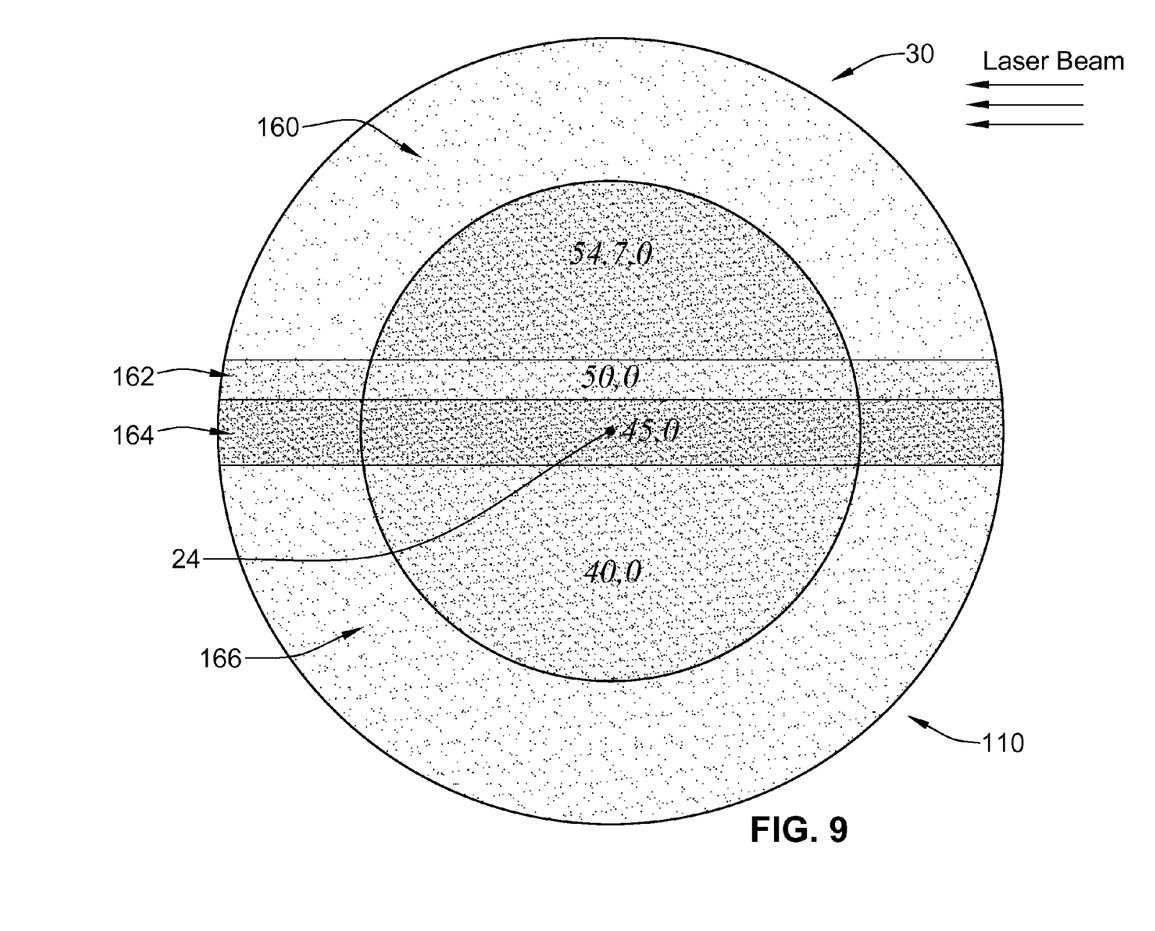
FIG. 9 is a front view of the optical fiber shown in FIG. 8 after the first series of cuts or cleaves are made.

As discussed above, each planar segment 120 is formed using a pair of angle identifiers ($\alpha$, $\beta$) that are selected to optimize the transmission of light at that specific point on the multi-faceted mirror 110. More specifically, the optical fiber 30 is cleaved at various angles to define the planar segments 120. For example, FIG. 8 is a side view of a plurality of cuts or cleaves made with respect to the Z-axis to form the angle $\alpha$ as discussed above. FIG. 9 is a front view of the optical fiber 30 after the cuts or cleaves are made along the Z-axis. It should be realized that the method of forming the multi-faceted mirror 110 described herein is described with respect to an optical fiber having a diameter of approximately 80 microns. However, it should also be realized that the angle identifiers and method of etching each planar segment 120 may be modified based on the diameter of the optical fiber. For example, assuming that the optical fiber has an outer diameter of 125 microns, the angle identifiers may be modified to optimize light transmission through the optical fiber having an outer diameter of 125 microns.

Referring again to FIG. 8, in the exemplary embodiment, the first portion 150 of cut1 or cleave1, to form the multifaceted mirror 110, is made from a first side 140 of the optical fiber 30 to a second side 142 of the optical fiber 30. In this embodiment, the first side 140 is disposed proximate to and receives light from the light source 40. Moreover, the second side 142 is opposite the first side 140 and is disposed in the V-groove 22. As shown in FIGS. 7 and 8, the first portion 150 of cut1 is made by laser etching the optical fiber at an angle of approximately 54.7 degrees. In this example, the angle identifier α is equal to approximately 54.7 such that the first cut 150 is made at an angle of approximately 54.7 degrees with respect to the Z-axis. Moreover, to improve production time, the first cut 150 is made along the entire width of the optical fiber 30.

A second portion 152 of cut1 is made by laser etching a portion of the optical fiber 30 at an angle of approximately 50 degrees, e.g. α is equal to approximately 50.0 degrees. As shown in FIG. 8, the laser etching tool is repositioned such that the second portion 152 of cut1 begins at a depth of approximately 30 microns from the first side 140 of the optical fiber 30 and ends at a depth of approximately 35 microns from the first side 140 of the optical fiber 30. After the second portion 152 of cut1 is made, it is clear that a first planar segment 160 and a second planar segment 162 are formed. The first planar segment 160 and the second planar segment 162 are also shown in FIG. 9.

A third portion 154 of cut1 is made by laser etching a portion of the optical fiber 30 at an angle of approximately 45 degrees, e.g. α is equal to approximately 45.0 degrees. More specifically, a laser etching tool is repositioned such that the third portion 154 of cut1 begins at a depth of approximately 35 microns from the first side 140 and extends to a depth of approximately 45 microns from the first side 140.

A fourth portion 156 of cut1 is made by laser etching a portion of the optical fiber 30 at an angle of approximately 40 degrees, e.g. α is equal to approximately 40.0 degrees. More specifically, a laser etching tool is repositioned such that the fourth portion 156 of cut1 begins at a depth of approximately 45 microns from the first side 140 and ends at the second side 142. After the fourth portion 156 of cut1 is made, it is clear that a third planar segment 164 and a fourth planar segment 166 are formed. The third planar segment 164 extends from the second planar segment 162 to a depth of approximately 45 microns at an angle α is equal to approximately 45 degrees. The fourth planar segment 166 extends from the third planar segment 164 to the second side 142 at an angle α is equal to approximately 40 degrees. The third and fourth planar segments 164 and 166 are also shown in FIG. 9.

Referring again to FIGS. 6 and 8, after the four portions (150, 152, 154, and 156) of cut1 or cleave1 are made along the Z-axis as shown in FIG. 8, additional cuts cut2 (157) and cut3 (159) or cleave2 and cleave3 are made about a 45 degree rotation of the Z-axis at the angles +/−β as shown in FIG. 6 cut2 and cut3 begin at a distance that is approximately +/−5 microns from the center optical axis of the optical fiber 30 and continue to the edge of the optical fiber 30 and thus form the multi-faceted mirror 110 on the optical fiber 30.

As discussed above, FIGS. 7 and 8 illustrate and describe exemplary cuts or cleaves that may be made to form a portion of the multi-faceted mirror on an optical fiber having an 80 micron diameter. In another exemplary embodiment, an optical fiber having a diameter of 125 microns may be cleaved to form the multi-faceted mirror 110. For example, the laser cleaves are adjusted as the cut across the fiber is being made. More specifically, for the first 32.5 microns of y axis movement, the z axis movement is programmed to give a 54.7 degree angled cut relative to the Z-axis or central optical axis 62 or 64, for example, of the optical fiber 30. For the next 20 microns of y axis movement, the z axis movement is programmed for a 52 degree angle. This is followed by 5 microns of y axis movement giving a 50 degree angle and then 10 microns more at 45 degrees followed by 5 microns more at 40 degrees and finally 52.5 microns more at 38 degrees. Once the vertical contour angles have been cut, the fiber is rotated by 45 degrees in the Y-Z plane. Next the laser cleave is used to additionally contour the new surface with 0 degree, +/−5 degree and +/−7 degree angled surfaces laterally about the projection of the fiber centerline These additional contours confine the lateral spreading of the light beam from the VCSEL or LED.

Referring again to FIG. 5, after the endface planar segments 120 have been etched, the reflective coating 116 is applied to an exterior surface of the multi-faceted mirror 110. During operation, the reflective coating 116 enables light transmitted through the optical fiber to be reflected off the mirrored surface through the optical fiber 30. To facilitate coating the multi-faceted mirror, at least a portion 117 of the outside surface of the optical fiber 30 that is adjacent to the light source 40 is masked to prevent metallization or coating. This masked area acts as a window 117 to allow an optical beam pathway to/from the multi-faceted mirror 110. In the exemplary embodiment, the reflective coating 116 is applied directly to the multi-faceted mirror 110 and at least a portion of the core and surrounding regions of the optical fiber endface. In one embodiment, the reflective coating 116 is a reflective metallic material having a thickness of approximately 1 micron. Optionally, other reflective coatings may be utilized. In another embodiment, to monitor the optical power emitted from the light source 40, a small aperture 121 may be formed through the mirror coating 116 to allow a portion of the emitted power to pass through the multi-faceted mirror 110 and proceed through the substrate 20 to a large area monitor detector (not shown) placed on the backside of the substrate 20. In order to meet the source launch requirements for mode power distribution, some of the lowest order mode content can be used for this monitor function.

As shown in FIG. 5 to install the optical fiber 30 into the interconnect device 10, the optical fiber 30 is positioned in the V-groove 22 and pushed forward until an end of the optical fiber 30 contacts the groove first end 54. More specifically, in the exemplary embodiment, described above, at least one of the planar segments 120 is etched to provide a physical indication when the optical fiber 30 has contacted the first end 54. In the exemplary embodiment, described above, the planar segment 212 is etched to have an angle α that is approximately 54.7 degrees. Moreover, the first end 54 is formed at an angle of 54.7 degrees. As such, the planar segment 212 also functions as a stopping device to enable an installer to determine when the optical fiber 30 is properly positioned in the groove 22. When the optical fiber 30 contacts the first end 54, the optical fiber 30 is properly positioned in the groove 22. Moreover, at this point, the multi-faceted mirror 110 is accurately positioned relative to the known location formed by the intersection of the V-groove first end 54 with the surface of the silicon wafer (endfacet datum E as shown in FIGS. 1, 3, and 5).

The optical fiber 30 is then secured within the groove using a UV adhesive, for example. Moreover, when the optical fiber 30 is properly positioned within the groove 22, at least a portion of the optical fiber 30 extends above the groove 22 by dimension $D_1$. In the exemplary embodiment, $D_1$ is approximately 3.2 microns thus, approximately 3.2 microns of the optical fiber 30 extends above the groove 22. Moreover, at least a portion of the optical fiber 30 extends beyond the groove 22 by a dimension $D_2$ In the exemplary embodiment, $D_2$ is approximately 2.3 microns thus approximately 2.3 microns of the optical fiber extends beyond the groove 22 endfacet datum E. This positioning enables the light source 40 to be properly aligned with respect to the multi-faceted mirror 110. Specifically, this positioning enables the light transmitted from the light source 40 to impinge on the centrally located planar segment 130 (shown in FIG. 6) as discussed above. The optical fiber 30 with the integral multi-faceted mirror 110 is properly aligned to the light source 40 when the endface 114 of the optical fiber 30 contacts the first end 54 of the groove 22 thus positioning the center of the mirror segment 130 directly beneath the center of the source 40 optical aperture.

As shown in FIG. 5, when the optical fiber 30 is properly positioned within the groove 22, a gap 260 is defined between the light source 40 and the optical fiber 30. In the exemplary embodiment, the gap 260 is filled with an optically transparent material 262. In the exemplary embodiment, the material 262 has an index of refraction that is selected to enhance coupling between the light source 40 and the optical fiber 30 to minimize reflections at this interface. Options for material 262 may include Parylene, an epoxy, a silicone or a number of transparent die underfill materials. Moreover, the material 262 also provides environmental protection of the optoelectronic die and prevents moisture from gaining ingress to the optical interface between the light source 40 and the window surface 117 of the optical fiber 30.

As shown in FIGS. 1 and 5, to enable the light source 40 to be electrically connected to the light source driver circuit 290, the interconnect device 10 utilizes the contacts 34 to provide ground-signal-ground electrical connection from the light source 40 to the light source driver circuit 290 that provides power to the light source 40. These contacts 34 are electrically connected, through wafer vias 38, to wafer back side electrically conducting contacts 36 (as shown in FIGS. 2 and 5). The electrical flex circuit 270 is used to interconnect device 10 to the light source driver circuit 290.

Referring again to FIG. 1, in the exemplary embodiment, each light source 40 is secured to the substrate 20 using a plurality of mounting pads 250. In the exemplary embodiment, the mounting pads 250 are disposed on the substrate 20 using a highly accurate photolithography technique to position the metal mounting pads 250 on the surface of the substrate 20 at a predetermined distance 252 from the first end 54 endface datum E. Moreover, the mounting pads 250 straddle each respective groove 22. In the exemplary embodiment, the array of mounting pads 250 is positioned to align with a separate array of mounting pads formed on the light source 40. As such, the location of the array of mounting pads 250 is determined based on the light source 40 being used. In another embodiment, the mounting pads 250 may be installed on the substrate 20 using a plating technique or an evaporation deposition technique. Moreover, the mounting pads 250 may be fabricated using a metallic material such as gold, tin, or various ratios of Gold and Tin. An optoelectronic die containing the light source 40 is then aligned to the mounting pads 250. This is done using an identical metal pad array on the light source (that is precisely located relative to the active light aperture on the die). Solder, such as tin or gold is added to this second metal pad array on the light source 40, and after tacking the light source 40 to the substrate 20 in a position with rough alignment of the metal pad arrays, the solder is reflowed to passively align the light source 40 to the desired location.

It should be realized that the light sources 40 are described herein as single and separate light sources, that the light sources 40 may be fabricated as a single device that includes multiple light sources 40 to further improve cost savings. For example a single die may be fabricated to include an array of 6 VCSELs each capable of 10 Gbit/second modulation speed. A single substrate 20 would have an array of six grooves, and an array of metal pads to align the light source die with the substrate.

As discussed above, the interconnect device, in the exemplary embodiment, includes six light sources 40. Each light source 40 is coupled to a respective flexible circuit 270 via the set of contacts 34. In the exemplary embodiment, contacts 34 are arranged in a set including three contacts, 272, 274, and 276. The contacts 272 and 276 function as grounds to ground the light source 40. Moreover, the contact 274 provides electrical signal power to the light source 40 to operate the light source 40. As shown in FIG. 5, the interconnect device also includes a plurality of electrical contacts 36 that are installed on the lower surface 278 of the substrate 20. In the exemplary embodiment, each set of contacts 34 is coupled to a respective set of contacts, e.g. contacts 36, installed on the substrate 20. For example, in the exemplary embodiment, the interconnect device 10 includes six light sources 40. Each light source 40 includes three contacts 34, e.g. 18 total contacts 34. As such, the interconnect device 10 also includes 18 contacts 34 that are installed on the substrate 20. In the exemplary embodiment, each contact 34 is coupled to a respective contact 36 utilizing a via 38 that is formed through the substrate 20. As such, in the exemplary embodiment, the interconnect device also include 18 vias 38. During assembly, the flexible circuit 270 is coupled to the contacts 36 to provide grounding and electrical power to the light source 40 utilizing the vias 38 and the contacts 34.

It is to be understood that the above description is intended to be illustrative, and not restrictive. For example, the above-described embodiments (and/or aspects thereof) may be used for light detection devices or in combination of light sources and light detection devices with each other on a single substrate 20. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus—function format and are not intended to be interpreted based on 35 U.S.C. §112, sixth paragraph, unless and until such claim limitations expressly use the phrase "means for" followed by a statement of function void of further structure.

What is claimed is:

1. An interconnect device comprising:
   a substrate having at least one groove formed therein, the groove including a first and second sidewall and a first end disposed at an end of the sidewalls;
   an optical fiber disposed in the groove, the optical fiber having a core and a cladding surrounding the core to form a cylindrical body, an endface formed on an end of the cylindrical body, and a multi-faceted mirror formed on the core; and
   a light source adapted to transmit light to the multifaceted mirror to launch light through the optical fiber; wherein a first portion of the multi-faceted mirror is formed at a first group of angles, a second portion of the multi-faceted mirror is formed at a different second angle, and a third portion of the multi-faceted mirror is formed a third angle that is different from the first and second angles.

2. The interconnect device of claim 1 wherein the light source is disposed adjacent to a side of the optical fiber, the light source configured to transmit light through a side of the optical fiber to the multi-faceted mirror.

3. The interconnect device of claim 1 wherein the multi-faceted mirror comprises a plurality of planar segments formed on the core of the optical fiber.

4. The interconnect device of claim 3 wherein the groove first end is formed at an angle α and wherein at least one planar segment of the multi-faceted mirror is formed at the angle α.

5. The interconnect device of claim 1 wherein the groove first end and the cladding are formed at an angle α.

6. The interconnect device of claim 1 wherein the groove first end is formed at an angle α and the cladding is configured to contact the first end in an installed position.

7. The interconnect device of claim 1 wherein the groove first end is formed at an angle α and wherein at least a portion of the multi-faceted mirror is formed at an angle β that is different than the angle α.

8. The interconnect device of claim 1 wherein the multi-faceted mirror comprises a reflective coating disposed on an external surface of the multi-faceted mirror.

9. The interconnect device of claim 1 further comprising:
   a gap formed between the light source and at least a portion of the optical fiber; and
   a sealant disposed in the gap.

10. The interconnect device of claim 1 wherein the light source comprises a vertical-cavity surface-emitting laser (VCSEL).

11. A fiber optic source interconnect device comprising:
   a silicon substrate having at least one groove formed therein, the groove including a pair of sidewalls and a first end disposed at an end of the pair of sidewalls,
   a first array of metal solder pads positioned on the silicon substrate relative to the groove;
   an optical fiber disposed in the groove, the optical fiber having a cylindrical body, an endface formed on an end of the cylindrical body, and a multi-faceted mirror formed on the endface, the multi-faceted mirror including a positioning facet configured to contact the first end of the silicon substrate groove, wherein a first portion of the multi-faceted mirror is formed at a first group of angles, a second portion of the multi-faceted mirror is formed at a different second angle, and a third portion of the multi-faceted mirror is formed at a third angle that is different from the first and second angles; and
   a light source disposed on the silicon substrate, the light source including a second array of metal solder pads that correspond to the first array of metal solder pads, the second array of solder pads being positioned relative to the source aperture, the light source configured to transmit light to the multi-faceted mirror to launch light through the optical fiber to a detector.

12. The interconnect device of claim 11 further comprising:
   a gap formed between the light source and at least a portion of the optical fiber; and
   a sealant disposed in the gap.

13. The interconnect device of claim 11 further comprising at least a second optical fiber installed in second respective groove, the second optical fiber having a cylindrical body, an endface formed on an end of the cylindrical body, and a multi-faceted mirror formed on the endface; the multifaceted mirror including a positioning facet configured to contact the first end of the groove when the optical fiber is in an installed position.

14. The interconnect device of claim 11 wherein the light source comprises a vertical-cavity surface-emitting laser (VCSEL).

15. The interconnect device of claim 11 wherein the multi-faceted mirror comprises a plurality of planar segments formed on the endface of the optical fiber and a reflective coating disposed on an external surface of the planar segments.

16. The interconnect device of claim 11 wherein the groove first end is formed at an angle α and wherein at least a portion of the multi-faceted mirror is formed at an angle β that is different than the angle α.

17. A fiber optic detector interconnect device comprising:
   a silicon substrate having at least one groove formed therein, the groove including a pair of sidewalls and a first end disposed at an end of the pair of sidewalls,
   a first array of metal solder pads positioned on the silicon substrate relative to the groove;
   an optical fiber disposed in the groove, the optical fiber having a cylindrical body, an endface formed on an end of the cylindrical body, and a multi-faceted mirror formed on the endface, the multi-faceted mirror including a positioning facet configured to contact the first end of the silicon substrate groove, wherein a first portion of the multi-faceted mirror is formed at a first group of angles, a second portion of the multi-faceted mirror is formed at a different second angle, and a third portion of the multi-faceted mirror is formed at a third angle that is different from the first and second angles; and
   a light detector disposed on the silicon substrate, the light detector having a second array of metal solder pads that correspond with the first array of metal solder pads, the second array of metal solder pads being positioned relative to the detector aperture and adapted to receive light from the multi-faceted mirror and receive light transmitted through the optical fiber from a light source.

18. The optical fiber of claim 17 wherein the cylindrical body comprises an optical core and a cladding surround the optical core, at least a portion of the cladding being formed at an angle, the first end of the substrate groove being formed at the same angle.

19. The optical fiber of claim 17 further comprising a reflective coating disposed on an external surface of the multi-faceted mirror.

* * * * *